(12) United States Patent
Yang et al.

(10) Patent No.: US 9,300,421 B2
(45) Date of Patent: Mar. 29, 2016

(54) METHODS TO ACHIEVE ACCURATE TIME STAMP IN IEEE 1588 FOR SYSTEM WITH FEC ENCODER

(71) Applicant: Altera Corporation, San Jose, CA (US)

(72) Inventors: Haiyun Yang, San Jose, CA (US); David W. Mendel, Sunnyvale, CA (US); Keith Duwel, San Jose, CA (US); Huy Ngo, San Jose, CA (US); Herman Henry Schmit, Palo Alto, CA (US)

(73) Assignee: Altera Corporation, San Jose, CA (US)

( * ) Notice: Subject to any disclaimer, the term of this patent is extended or adjusted under 35 U.S.C. 154(b) by 129 days.

(21) Appl. No.: 14/058,718

(22) Filed: Oct. 21, 2013

(65) Prior Publication Data

US 2014/0269778 A1 Sep. 18, 2014

Related U.S. Application Data

(60) Provisional application No. 61/782,995, filed on Mar. 14, 2013.

(51) Int. Cl.
*H04J 3/06* (2006.01)

(52) U.S. Cl.
CPC ............ *H04J 3/0697* (2013.01); *H04J 3/0667* (2013.01)

(58) Field of Classification Search
CPC ...... H04J 3/0061; H04J 3/0067; H04J 3/0097
See application file for complete search history.

(56) References Cited

U.S. PATENT DOCUMENTS

2005/0005189 A1* 1/2005 Khermosh et al. ................ 714/4
2007/0157060 A1* 7/2007 Ganga et al. .................. 714/752
2011/0161701 A1* 6/2011 Blixt et al. .................... 713/320

OTHER PUBLICATIONS

"Forward Error Correction (FEC) Sublayer for 10GBASE-R PHYs," IEEE Standard 802.3-2008, Section 74, 2008.
"IEEE Standard for a Precision Clock Synchronization Protocol for Networked Measurement and Control Systems," IEEE Instrumentation and Measurement Society, IEEE Standard 1588™-2008, Section 6.6.5, 2008.
"Physical Coding Sublayer (PCS) for 64B/66B, Type 10GBASE-R," IEEE Standard 802.3-2008, Section 49, 2008.
"Reconciliation Sublayer (RS) and 10 Gigabit Media Independent Interface (XGMII)," IEEE Standard 802.3-2008, Section 46, 2008.

* cited by examiner

*Primary Examiner* — Albert T Chou
(74) *Attorney, Agent, or Firm* — Fletcher Yoder, P.C.

(57) ABSTRACT

Systems and methods and systems are disclosed for allowing the medium access control (MAC) layer in a communication system within an integrated circuit or device to accurately determine a timestamp point and a timestamp value when, for example, the Precision Time Protocol (PTP) protocol is in use by the communication system. Such determination of accurate timestamp point and timestamp value may be used by the communication system to account for and to compensate for the time shift(s) from forward error correction (FEC) sublayer changes in a data frame that is transmitted by the MAC layer. Feedback is provided to the MAC from the FEC to allow the MAC to accurately determine the timestamp point and timestamp value align preamble of the data frame to the beginning of the FEC bit block that is output by the FEC sublayer.

17 Claims, 5 Drawing Sheets

METHODS TO ACHIEVE ACCURATE TIME STAMP IN IEEE 1588 FOR SYSTEM WITH FEC ENCODER

CROSS REFERENCE

This patent document claims the benefit of, and priority to, U.S. Provisional Application No. 61/782,995, filed Mar. 14, 2013, the disclosure of which is hereby incorporated by reference herein in its entirety.

FIELD OF THE DISCLOSURE

This disclosure relates to systems and methods for more accurately determining a timestamp value in a communication system for an integrated circuit and/or for a programmable logic device.

BACKGROUND OF THE DISCLOSURE

Numerous network applications require the synchronization of clocks running at various nodes in the network. The IEEE 1588 protocol, standardized by the Institute of Electrical and Electronic Engineers (IEEE), is a protocol that defines the Precision Time Protocol (PTP), which enables the accurate synchronization of different clocks operating on nodes in a network. Such synchronization of clocks is generally achieved by transmitting data packets containing timestamps to the clocks being synchronized.

The IEEE 1588 protocol is designed to measure the time taken by data packets containing timestamps to travel across a communication medium (typically a wired medium, such as the Ethernet) and the time taken to transport these data packets over intermediate nodes in the network that may have variable buffering delays. In PTP, a timestamp message (also known as a PTP message) is embedded in the data portion of an Ethernet frame by the Media Access Control (MAC) layer. In each such frame, there is typically an 8-bit start frame delimiter (SFD) included after a preamble (usually 7 octets in length). The SFD may have a fixed pattern of 10101011 with the timestamp point being chosen as the $1^{st}$ bit of the SFD. The timestamp value is the time at which the timestamp point is transmitted on the communications medium. This timestamp value is included in each PTP message that is sent in an Ethernet frame.

There may be a delay, introduced by the physical coding sub-layer (PCS) and possibly other components, between the time instance when a PTP message is generated by the MAC layer and the time instance when the $1^{st}$ bit of the SFD is transmitted on the communications medium. For some Ethernet applications, the timestamps need to account for this additional latency and the latency of the PCS has to be fixed and known by the MAC layer to achieve high resolution of data at the receiver. However, in IEEE 10G-BASE KR networks, the latency of the PCS may not be fixed and/or known. Moreover, in such 10G-BASE KR networks with forward error correction (FEC), a transcoding block removes one sync bit in each 66-bit PCS codeword to create space for parity check bits. Because this process changes the position of the original message bits, the PTP protocol should account for this change in order to correctly determine the appropriate timestamp values to be transmitted in PTP messages. For applications that may demand rates at or above 10GE and for applications that may require a high amount of accuracy, there is a need for allowing a MAC layer to transmit appropriate timestamps, which take into account FEC changes and other delays.

SUMMARY OF THE DISCLOSURE

To address the shortcomings within the art, the present disclosure provides methods and systems for allowing the MAC layer to correctly determine the timestamp point as well as the timestamp value that account for and that may be used to compensate for the time shift from FEC changes and possible other delays. Such compensation by the MAC layer allows the networked system to achieve high resolution of data at the receiver.

Methods and systems are provided for determining a timestamp value using a communication system for an integrated circuit or for a programmable logic device. In some embodiments, the communication system may include transmitter circuitry that may include a forward error correction (FEC) layer and a medium access control (MAC) layer. In some embodiments the transmitter circuitry may be IEEE 10G-BASE KR transmitter circuitry. In some embodiments the message includes the timestamp value as a part of a Precision Time Protocol message. In some embodiments, the FEC layer may be coupled to the MAC layer by a feedback link. In some embodiments, the FEC layer may be coupled to the MAC layer by both a feedback link and a data link. A message may be sent to a FEC layer (e.g., on the data link) using a MAC layer. A feedback signal may be asserted, using the FEC layer, on a feedback link when the message arrives at the FEC layer.

In some embodiments, the MAC layer may determine the timestamp value associated with the message based on the asserted feedback signal. In some embodiments, the message may include a preamble of an Ethernet frame. In some embodiments, the feedback signal may be generated by a signal checking block within the FEC layer.

In some embodiments, the transmitter circuitry may include a physical coding sub-layer (PCS) that includes a signal delay block. The PCS may be coupled between the MAC layer and the FEC layer. The feedback signal may be based on an output of the signal delay block. In some embodiments, the PCS may include a pulse generation block. The feedback signal may be based on an output of the pulse generation block.

BRIEF DESCRIPTION OF THE DRAWINGS

Further features of the disclosure, its nature and various advantages will be apparent upon consideration of the following detailed description, taken in conjunction with the accompanying drawings, in which like reference characters refer to like parts throughout, and in which.

DETAILED DESCRIPTION OF THE INVENTION

To provide an overall understanding of the invention, certain illustrative embodiments will now be described. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

The figures described herein show illustrative embodiments; however, the figures may not necessarily show and may not be intended to show the exact layout of the hardware components contained in the embodiments. The figures are provided merely to illustrate the high level conceptual layouts of the embodiments. The embodiments disclosed herein may be implemented with any suitable number of components and any suitable layout of components in accordance with principles known in the art.

Figure 1:
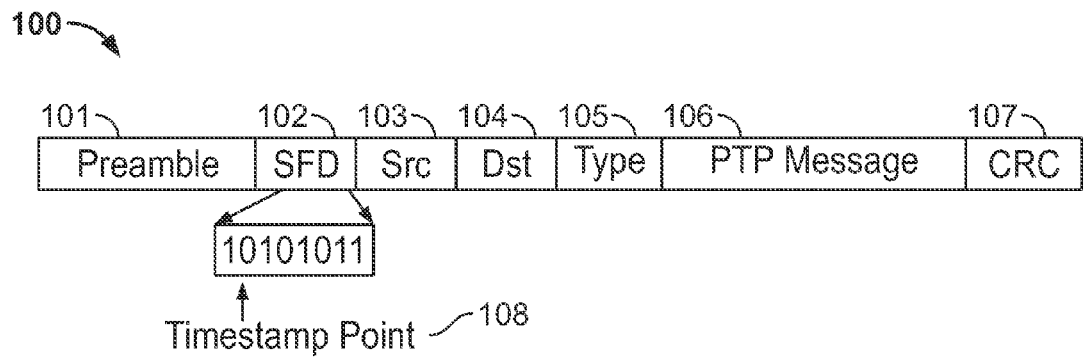
FIG. 1 is a simplified block diagram of an Ethernet Frame with a PTP message embedded therein, according to an illustrative embodiment.

FIG. 1 is a simplified block diagram of Ethernet frame 100 with a PTP message 106 embedded therein, according to an illustrative embodiment. Ethernet frame 100 includes preamble 101, start frame delimiter (SFD) 102, source address 103, destination address 104, type 105, PTP message 106, and cyclic redundancy check (CRC) 107. Preamble 101 may be used indicate the start of Ethernet frame 100 and may be 7-octets in length. SFD 102 may be used to indicate the end of preamble 101 in Ethernet frame 100. SFD 102 may include 8 bits, and as discussed above, may also include a timestamp point. Source address 103 may indicate the source from which Ethernet frame 100 has been transmitted. Destination address 104 may indicate the destination to which Ethernet frame 100 should be transmitted. Type 105 may indicate the type of data that is being transmitted in Ethernet frame 100. PTP message 106 may be a message similar to a PTP message as described above. PTP message 106 may include a timestamp value and may be embedded in the data portion of Ethernet frame 100 by the Media Access Control (MAC) layer. CRC 107 includes a set of bits that may allow for the detection of errors that may occur within Ethernet frame 100 when it is transmitted through a communications medium.

Figure 2:
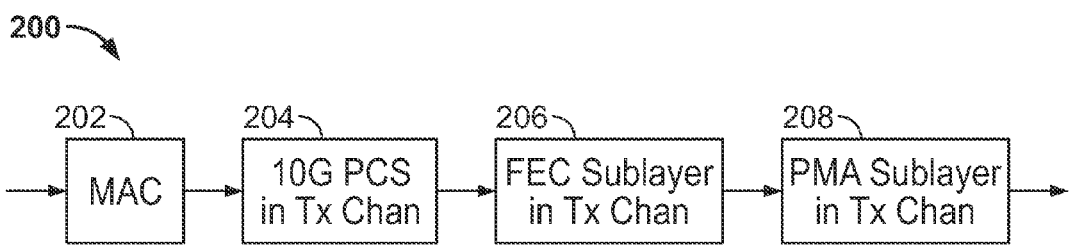
FIG. 2 is a simplified block diagram of a representative portion of a 10G-BASE KR transmitter circuitry, according to an illustrative embodiment.

FIG. 2 is a simplified block diagram of a representative portion of a 10G-BASE KR transmitter circuitry, according to an illustrative embodiment. 10G-BASE KR Transmitter circuitry 200 includes MAC layer 202, 10G PCS layer 204, FEC sublayer 206 (as used herein, a FEC sublayer may also be referred to as a FEC layer), and physical medium attachment (PMA) sublayer 208. Transmitter circuitry 200 may be used to transmit data in numerous applications.

Various serial data communication protocols employ a few more bits than the minimum number needed to actually represent the data being communicated. Such extra bits may be used for controlling the maximum run length in a clock data recovery (CDR) system. The extra bits may also be used for such purposes as indicating word alignment boundaries for block synchronization, parity checking, error correction coding, etc. For example, several industry-standard codes have been or are being developed that transmit 66 bits for every 64 bits of "actual," "real," or "payload" data content. Such a signaling or communication protocol may be referred to as 64B66B encoding or the like. In 10G-BASER communications, 64B66B encoding may be used by a transmitter, such as by 10G-BASE KR Transmitter circuitry 200.

MAC layer 202 may allow communication with a multiple access medium, such as Ethernet, and may also provide timestamps for the synchronization of multiple communicating nodes communicating on the multiple access medium. 10G PCS layer 204 may perform serial processing of data-bits. FEC sublayer 206 may encode data-bits by adding additional bits to the data-bits to mitigate data transmission errors. PMA sublayer 208 may provide a clock signal to circuitry within 10G-BASE KR Transmitter circuitry 200 and also may be used to communicate data with other devices outside of circuitry 200.

Generally, a 10G-BASER PCS layer outputs 66 bits for each 64 bits of data and 8 bits of control that are input to the PCS. The 66 bits include the 64-data-bits and 2-sync-bits (which are 01 or 10). However, in a 10G-BASE KR-FEC, FEC sublayer 206 may output a single sync-bit (either 0 or 1) while removing the other sync-bit (thus outputting 65 bits for each 64 bits of data). In addition, FEC sublayer 206 may concatenate 32-parity-check-bits to each block of 2080 bits (a block with 32 different 64-bit data with sync bits). The resulting block of 2112 bits output by FEC sublayer 206, to PMA sublayer 208, may be referred to as a FEC bit block.

Figure 3:
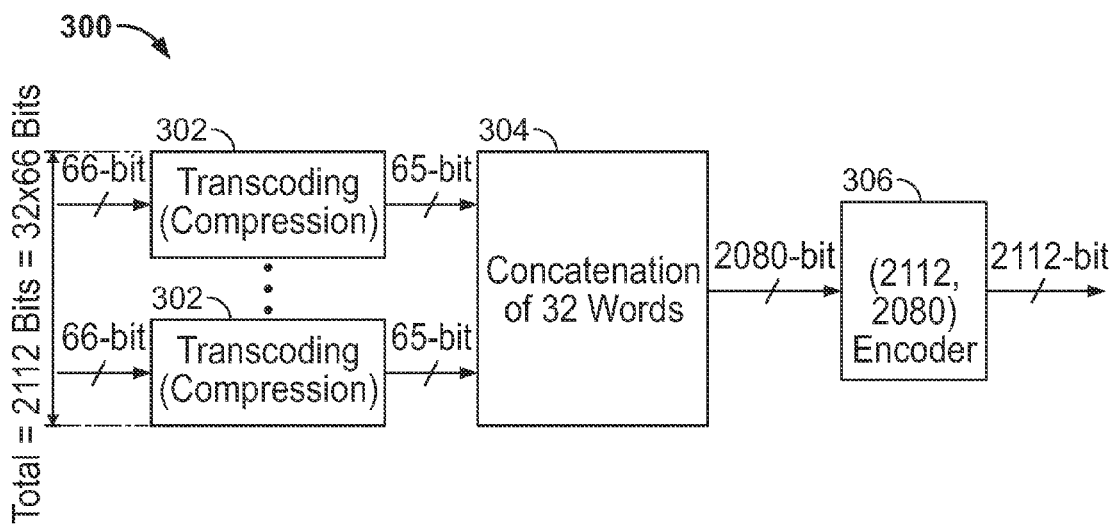
FIG. 3 is a simplified block diagram showing the transcoding, concatenation, and encoding aspects of the KR-FEC transmit (Tx) Channel, according to an illustrative embodiment.

FIG. 3 is a simplified block diagram showing the transcoding, concatenation, and encoding aspects of the KR-FEC transmit (Tx) Channel, according to an illustrative embodiment KR-FEC sublayer 300 includes one or more transcoding blocks 302, concatenation block 304, and encoder 306.

KR-FEC sublayer 300 may be similar to FEC sublayer 206. For example, there may be 32 transcoding blocks 302. Each of the transcoding blocks 302 may have a 66 bit input (64-data-bits and 2-sync-bits) and may have a 65 bit output. For each 66 bit input, transcoding block 302 may remove one sync-bit of the two input sync-bits. The 65-bit output of each of transcoding blocks 302 may be input to concatenation block 304. Concatenation block 304 may receive 32 separate 65-bit inputs, one from each of the transcoding blocks 302. Concatenation block 304 may concatenate together the 32 separate 65-bit inputs into a single block of 2080-bits. Concatenation block 304 may output the single block of 2080-bits to encoder 306. Encoder 306 may receive 2080 bits from concatenation block 304. Encoder 306 may encode the 2080 bits by adding 32 parity bits to the end of the 2080 bits received from concatenation block 304 and may output 2112 bits. The 2112 output bits may be output by KR-FEC sublayer 300, for example, to a KR-PMA sublayer.

Figure 4:
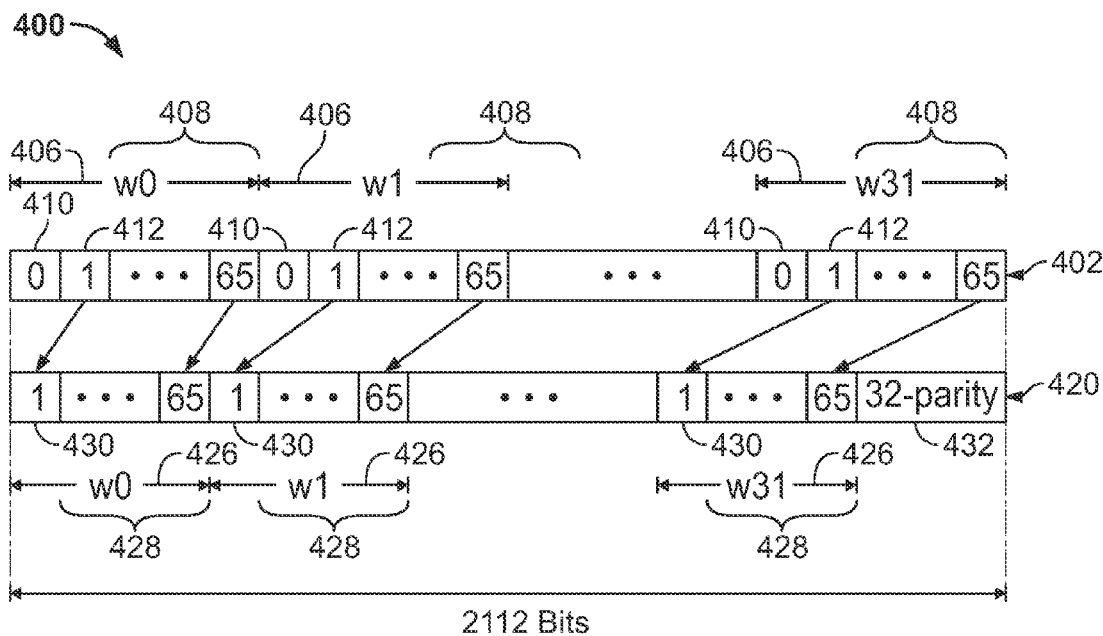
FIG. 4 is a simplified block diagram of the relationship between the bits of the input and the output of a KR-FEC Tx Channel, according to an illustrative embodiment.

FIG. 4 is a simplified block diagram of the relationship between the bits of the input and the output of a KR-FEC Tx Channel, according to an illustrative embodiment. Diagram 400 shows the relationship between the bits of input 402 to a KR-FEC sublayer, such as KR-FEC sublayer 300, and output 420 of the KR-FEC sublayer.

Both input 402 and output 420 may be blocks that each has 2112 bits. Input 402 may includes 32 words 406, each of which is 66 bits in length. These 66 bits included in each word of input 402 may include 64-data-bits 408 and 2-sync-bits 410 and 412. Output 420 may include 32 words 426, each of which is 65 bits in length, and each of which maps to one of the words 406 in input 402. The 65 bits included in each word of output 420 may include 64-data-bits 428 and 1-sync-bit 430. In addition, output 420 may include 32 parity bits 432.

As discussed with reference to FIG. 3, a KR-FEC sublayer may include transcoding blocks which remove one sync bit (bit 0 as shown in FIG. 4) from each of words 406 in input 402 to produce each of words 426 in output 420. Thus, the position of the 2080 bits remaining from input 402, once the sync bits are removed, is shifted as shown by output 420 of FIG. 4. As discussed with reference to FIG. 3, a KR-FEC sublayer may encode the resulting block of 2080 bits, in output 420, by including 32 additional parity bits 432 at the end of output 420. Since one sync bit in each word is removed from input 402, and 32 parity bits are added to output 420, input 402 and output 420 are of the same size. Because Bit 0 (the $1^{st}$ sync bit) is removed, from each of words 406 in input 402 by the transcoding blocks, bit 1 of word 1 has a 1-unit interval (UI) time shift and bit 65 of word 31 has a 32-UI time shift. If the MAC layer in a 10G-BASE KR transmitter does not have the information relating to this time shift(s) at the FEC sublayer (such as such as KR-FEC sublayer 300 of FIG. 3), at worst case, a 32-UI time offset could occur when the MAC layer is determining a timestamp value for a PTP message.

As described above, with relation to FIG. 4, each bit of the KR-FEC sublayer output FEC bit block may have some amount of UI time shift. The amount of UI time shifts has a fixed relationship with the position of each bit in the output FEC bit block. Given that an Ethernet frame (e.g., Ethernet frame 100 of FIG. 1) with a timestamp point in the SFD is transmitted as input to the KR-FEC sublayer, the amount of UI time shifts has a fixed relationship with the position of the timestamp point in the output of the KR-FEC sublayer. In order for the MAC layer to accurately determine timestamp values, it is important for the MAC layer to correctly determine the bit position of the timestamp point at, for example, the encoder in the KR-FEC sublayer. By correctly determining the bit position of the timestamp point, the MAC layer can generate a timestamp value, for the PTP message, which correctly compensates for UI time shifts caused by the KR-FEC sublayer.

Figure 5:
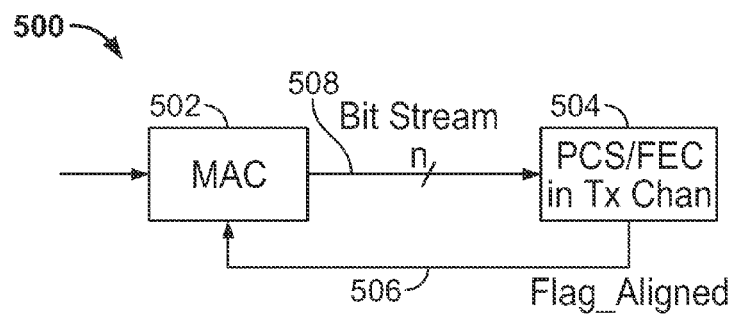
FIG. 5 is a simplified block diagram of the MAC layer and the PCS/FEC layers in a Tx Channel and a link between the layers.

FIG. 5 is a simplified block diagram of the MAC layer and the PCS/FEC layers in a Tx Channel and a link between the layers. Transmitter circuitry 500 includes MAC layer 502 and PCS/FEC layers 504 (combined into one conceptual block), and feedback link 506.

MAC layer 502 may be similar to MAC layer 202 of FIG. 2 and PCS/FEC layers 504 may be similar to PCS layer 204 combined with FEC sublayer 206 of FIG. 2. MAC layer 502 may output a bit stream on link 508 to PCS/FEC layers 504. Feedback link 506 may provide, from PCS/FEC layers 504, a signal (flag_aligned) to MAC layer 502 or to a monitoring block (not shown) within or attached to MAC layer 502. Transmitter circuitry 500 may have two modes, which may include a training mode and a normal mode. During training mode, MAC layer 502 may output a special bit stream that includes a timestamp point (e.g., similar to the Ethernet frame 100 of FIG. 1), on link 508, as input to PCS/FEC layers 504. PCS/FEC layers 504 may be able to detect whether the timestamp point is aligned with the beginning of a FEC bit block. If the timestamp point is aligned with the beginning of a FEC bit block, the feedback signal, flag_aligned, on feedback link 506, may be asserted (e.g., set to 1) by an element within PCS/FEC layers 504.

When MAC layer 502 determines that the signal flag_aligned is asserted (e.g., set to 1) on feedback link 506, MAC layer 502 determines that the current timestamp point is aligned with the FEC bit block. In some embodiments, the monitoring block may receive the asserted signal flag_aligned and may notify MAC layer 502 that the current timestamp point is aligned with the FEC bit block. After the signal flag_aligned is asserted (e.g., set to 1) MAC layer 502 may switch the operation of transmitter circuitry 500 to normal mode of operation. During normal mode of operation of transmitter circuitry 500, for example, MAC layer 502 with or without the use of the monitoring block may be able to accurately track the bit position of the next timestamp point as long as it can track the number of bits to be transmitted.

Figure 6A:
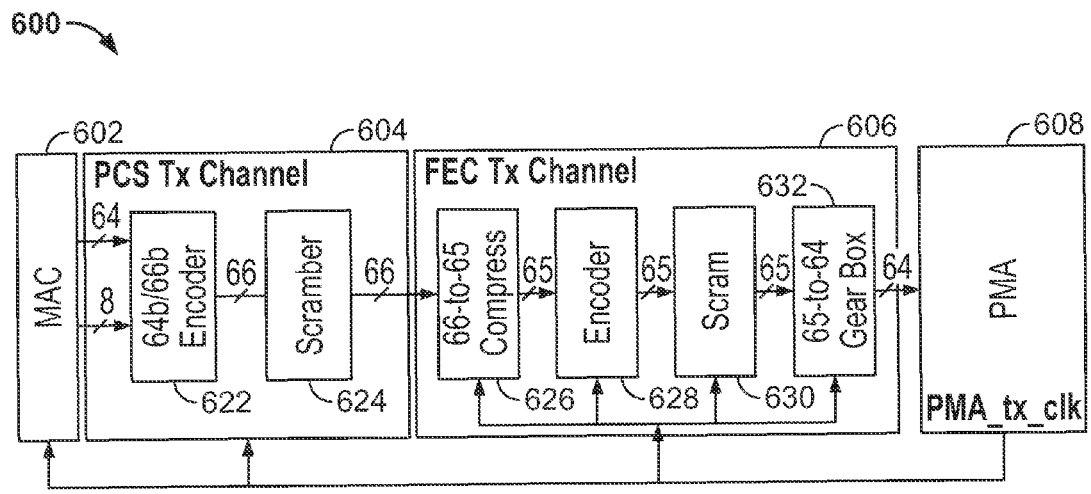
FIG. 6A is more detailed, yet still simplified, block diagram of a representative portion of the 10G-BASE KR transmitter circuitry of FIG. 2, according to an illustrative embodiment.

FIG. 6A is more detailed, yet still simplified, block diagram of a representative portion of the 10G-BASE KR transmitter circuitry of FIG. 2, according to an illustrative embodiment. Transmitter circuitry 600 includes MAC layer 602, PCS layer 604, FEC sublayer 606, and physical PMA sublayer 608. Transmitter circuitry 600 and the components within may be similar in form and in function to the corresponding circuitry and components of transmitter circuitry 200 of FIG. 2. Transmitter circuitry 600 may be a 10G-BASE KR transmitter.

MAC layer 602 may allow communication with a multiple access medium, such as Ethernet, and may also provide timestamps for the synchronization of multiple communicating nodes communicating on the multiple access medium. PCS layer 604 may include 64B/66B encoder 622 and scrambler 624 and may perform processing of data-bits. FEC sublayer 606 may include 66-to-65 bit compressor 626, Encoder 628, Scrambler 630, and 65-to-64 bit gearbox 632. FEC sublayer 606 may encode data-bits by adding additional bits to the data-bits to mitigate data transmission errors. PMA sublayer 608 may provide a clock signal to circuitry within transmitter circuitry 600 and also may be used to communicate data with other devices outside of circuitry 600.

MAC layer 602 may output 64 bits of data on a 64-bit data bus/link to 64B/66B encoder 622 as well as 8 bits of control data on 8-bit control bus/link to 64B/66B encoder 622. The 8 bits of control data on 8-bit control bus may specify if the 64 bits on the 64-bit data bus are data or control information. 64B/66B encoder 622 may perform 64B/66B encoding, as described above, on the 64 bits received from MAC layer 602. 64B/66B encoder 622 may output the 66 bits of 64B66B encoded data to scrambler 624. Scrambler 624 may scramble the 66 bits received from 64B/66B encoder 622, for example, to give the bits certain useful engineering properties. Scrambler 624 may output the resulting 66 bits to 66-to-65 bit compressor 626.

Compressor 626 may be similar in operation to one of the transcoding blocks 302 of FIG. 3. Compressor 626 may have as input 66 bits (64-data-bits and 2-sync-bits) and may have as output 65 bits. For each 66 bit input, compressor 626 may remove one sync-bit of the input 2-sync-bits. The output of compressor 626 may be input to encoder 628. Encoder 628 may encode the bits it receives for a block of 2112 bits at every block cycle. The way in which encoder 628 encodes input bits (e.g., by adding 32 parity bits) may be shown and discussed with greater detail in FIG. 4 and the corresponding description. Encoder 628 may output encoded bits to scrambler 630. Scrambler 630 may scramble the bits received from encoder

628, for example, to give the bits certain useful engineering properties. Scrambler 630 may output the resulting bits to 65-to-64 bit gearbox 632 at every block cycle. 65-to-64 bit gearbox 632 takes the input bits from scrambler 630 and outputs 64 bits of data (e.g., parallel data) to PMA sublayer 608.

PMA sublayer 608 may receive the 64 bits of data from 65-to-64 bit gearbox 632 and may communicate that data to circuitry outside of transmitter circuitry 600. PMA sublayer 608 may provide a transmission clock at ⅟₆₄ the rate of the bit clock to each of the components within transmitter circuitry 600 via clock bus 634 to synchronize the components within transmitter circuitry 600.

Figure 6B:
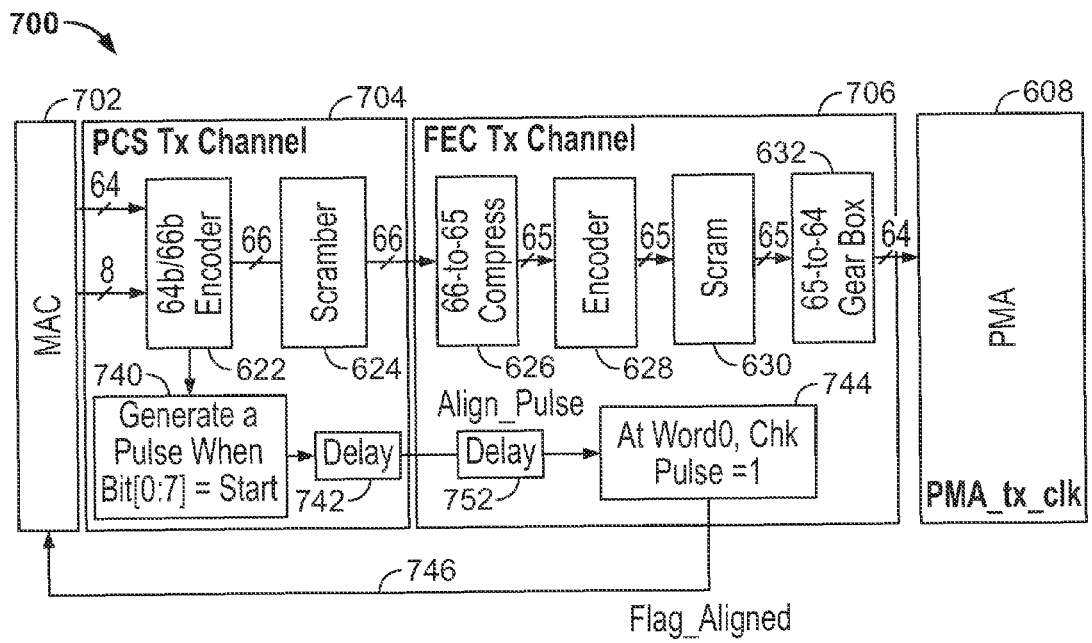
FIG. 6B shows a block diagram of a representative portion of the 10G-BASE KR transmitter circuitry with an additional MAC and KR-FEC Tx Channel link that makes use of a start control character, according to an illustrative embodiment.

FIG. 6B shows a block diagram of a representative portion of the 10G-BASE KR transmitter circuitry with an additional MAC and KR-FEC Tx Channel link that makes use of a start control character, according to an illustrative embodiment. Transmitter circuitry 700 is similar in form and in function to transmitter circuitry 600 of FIG. 6A. Transmitter circuitry 700 includes MAC layer 702, PCS layer 704, FEC sublayer 706, and physical PMA sublayer 608. Transmitter circuitry 700 may also include pulse generation block 740 and delay block 742 in PCS layer 704, and delay block 752 and pulse checking block 744 in FEC sublayer 706. Pulse generation block 740, delay block 742, delay block 752 and pulse checking block 744, may be used, for example, during the training mode of operation of transmitter circuitry 700.

MAC layer 702 may be similar in function to MAC layer 602 of FIG. 6A, but may also receive additional flag_aligned signal 746 (similar to what is described with reference to FIG. 5) from pulse checking block 744. MAC layer 702 may output, for example, 64 bits of data, on a 64-bit data bus/link to 64B/66B encoder 622 as well as, for example, 8 bits of control data on 8-bit control bus/link to 64B/66B encoder 622.

The interface between MAC layer 702 and PCS layer 704 may be the 10 Gigabit Media Independent Interface (XG-MII). This XGMII interface may convert the first octet of the 7-octet preamble in a frame (similar to Ethernet frame 100 of FIG. 1) to a special control character referred to as a start control character. For example, this may occur during the training mode of operation of transmitter circuitry 700. Bit 0 of the start control character (which is 8 bits in length) may align with bit 0 or bit 32 of the 64 bits output by MAC layer 702 on the 64-bit data bus. Because of the placement of the start control character in the preamble of a frame, the start control character has a fixed relationship with the timestamp point in the frame output by the MAC layer.

The start control character may be available during the PCS encoding process (i.e., during the operation of 64B/66B encoder 622). 64B/66B encoder 622 may output the data received from the MAC layer on the data bus to the circuitry of pulse generation block 740. Pulse generation block 740 may be used to indicate whether current bit[0:7] (i.e., the current 8 bits at the input or output of 64B/66B encoder 622) is the XGMII start control character. If bit[0:7] is the start control character, pulse generation block 740 may generate a pulse signal and output that signal to delay block 742. Delay block 742 may delay the pulse signal by an amount that substantially matches the latency of data as it traverses through scrambler 624. Delay block 742 may assert and output the pulse signal, also referred to as the align_pulse signal, to delay block 752. Delay block 752 may delay the align_pulse signal by an amount that substantially matches the latency of any combination of 66-to-65 bit compressor 626, Encoder 628, Scrambler 630, and 65-to-64 bit gearbox 632 within FEC sublayer 706. Delay block 752 may output the align_pulse signal to pulse checking block 744. If the bit[0:7] is the start control character in PCS layer 704, align_pulse may be asserted (e.g., set to a logic high signal). If align_pulse is asserted at the time Word 0 (i.e., the first word) of the FEC bit block is traversing FEC sublayer 706, pulse checking block 744 may assert flag_aligned signal 746 (e.g. set flag_aligned to a logic high signal, or 1) on the feedback link associated with flag_aligned signal 746.

When flag_aligned signal 746 is asserted by pulse checking block 744, MAC layer 702 may determine when the start of the FEC bit block (e.g., the first word) traverses through the FEC sublayer 706 after transmitting the preamble (that includes the start control character). Therefore MAC layer 702 may be able to align the beginning of the preamble of a frame with the start of the FEC bit block (e.g., the first word). In particular, the flag_aligned signal may be provided to MAC layer 702 or to a monitoring block (not shown) within or attached to MAC layer 702. The MAC layer or the monitoring block may have knowledge of the relationship of the transmitted preamble to the timestamp point (based on information it receives from the MAC layer) and knowledge of the forward error correction process in FEC sublayer. Using this information, the MAC layer may accurately determine the offset of a timestamp point for all future PTP messages. In some embodiments, the monitoring block may determine the offset of a timestamp point for all future PTP messages by tracking/counting the number of bits transmitted (e.g., until the next timestamp point is expected to occur in a next transmitted frame). The monitoring block may notify or make changes to the MAC layer based this determination. In some embodiments, the MAC layer may determine the offset of a timestamp point for all future PTP messages by tracking/counting the number of bits transmitted (e.g., until the next timestamp point is expected to occur in a next transmitted frame).

Figure 6C:
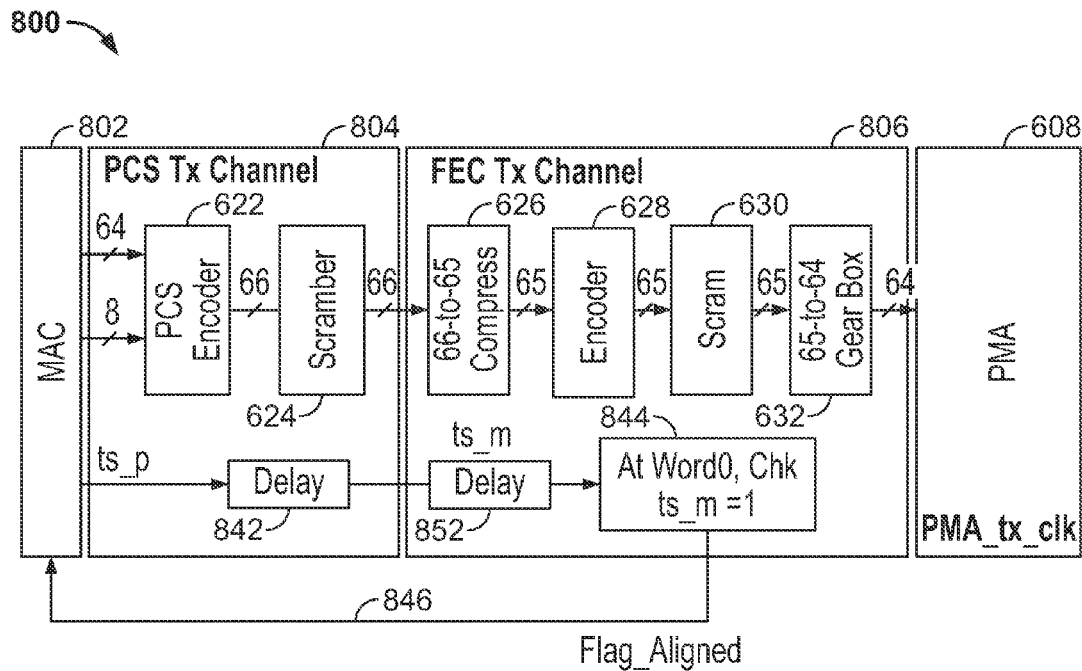
FIG. 6C shows a block diagram of a representative portion of the 10G-BASE KR transmitter circuitry with an additional MAC and KR-FEC Tx Channel link that makes use of a dedicated indication signal, according to an illustrative embodiment.

FIG. 6C shows a block diagram of a representative portion of the 10G-BASE KR transmitter circuitry with an additional MAC and KR-FEC Tx Channel link that makes use of a dedicated indication signal, according to an illustrative embodiment. Transmitter circuitry 800 is similar in form and in function to transmitter circuitry 600 of FIG. 6A. Transmitter circuitry 800 includes MAC layer 802, PCS layer 804, FEC sublayer 806, and physical PMA sublayer 608. Transmitter circuitry 800 may also include delay block 842 in PCS layer 804, and delay block 852 and indication checking block 844 in FEC sublayer 806. Delay block 842 in PCS layer 804, and delay block 852 with indication checking block 844 in FEC sublayer 806, may be used, for example, during the training mode of operation of transmitter circuitry 800.

MAC layer 802 may be similar in function to MAC layer 702 of FIG. 6B, but may output a signal ts_p to delay block 842 in addition to, for example, 64 bits of data on a 64-bit data bus/link to 64B/66B encoder 622, and, for example, 8 bits of control data on 8-bit control bus/link to 64B/66B encoder 622. The signal ts_p may be referred to as a dedicated indication signal. MAC layer 802 may assert (e.g., set equal to a logic high signal or 1) this dedicated indication signal when the MAC layer transmits the preamble of a frame (similar to Ethernet frame 100 of FIG. 1). Delay block 842 may delay the indication signal input by MAC layer 802 by an amount that substantially matches the latency of data as it traverses through 64B/66B encoder 622 and scrambler 624. Delay block 842 may output the delayed version, ts_m, of the dedicated indication signal, ts_p, to delay block 852. Delay block 852 may delay the ts_m signal by an amount that substantially matches the latency of any combination of 66-to-65 bit compressor 626, Encoder 628, Scrambler 630, and 65-to-64 bit gearbox 632 within FEC sublayer 806. Delay block 852 may output the ts_m signal to indication checking block 844. If the ts_p signal is asserted at the time Word 0 (i.e., the first word) of the FEC bit block is traversing FEC sublayer 806, indication checking block 844 may assert flag_aligned signal 846 (e.g. set flag_aligned to a logic high signal or 1) on the feedback link associated with flag_aligned signal 846.

When flag_aligned signal 846 is asserted by indication checking block 844, MAC layer 802 may determine when the start of the FEC bit block (e.g., the first word) traverses through the FEC sublayer 806 after transmitting the preamble of the frame. Therefore, MAC layer 802 may be able to align the beginning of the preamble of a frame with the start of the FEC bit block. In particular, the flag_aligned signal may be provided to MAC layer 802 or to a monitoring block (not shown) within or attached to MAC layer 802. The MAC layer or the monitoring block may have knowledge of the relationship of the transmitted preamble to the timestamp point (based on information it receives from the MAC layer) and knowledge of the forward error correction process in FEC sublayer. Using this information, the MAC layer may accurately determine the offset of a timestamp point for all future PTP messages. In some embodiments, the monitoring block may determine the offset of a timestamp point for all future PTP messages by tracking/counting the number of bits transmitted (e.g., until the next timestamp point is expected to occur in a next transmitted frame). The monitoring block may notify or make changes to the MAC layer based on this determination. In some embodiments, the MAC layer may determine the offset of a timestamp point for all future PTP messages by tracking/counting the number of bits transmitted (e.g., until the next timestamp point is expected to occur in a next transmitted frame). The scheme described in FIG. 6C, i.e. making use of a dedicated indication signal, may be used, for example, independent of whether the interface between the MAC layer and the PCS layer is the XGMII type of interface.

Figure 6D:
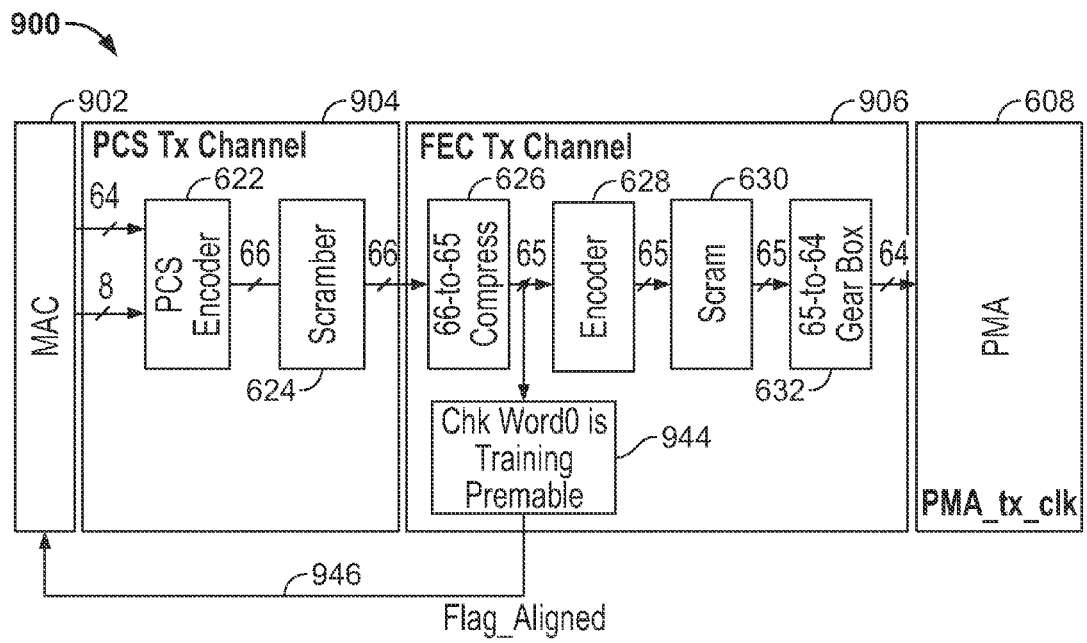
FIG. 6D shows a block diagram of a representative portion of the 10G-BASE KR transmitter circuitry with an additional MAC and KR-FEC Tx Channel link that makes use of a training preamble, according to an illustrative embodiment.

FIG. 6D shows a block diagram of a representative portion of the 10G-BASE KR transmitter circuitry with an additional MAC and KR-FEC Tx Channel link that makes use of a training preamble, according to an illustrative embodiment. Transmitter circuitry 900 is similar in form and in function to transmitter circuitry 600 of FIG. 6A. Transmitter circuitry 900 includes MAC layer 902, PCS layer 904, FEC sublayer 906, and physical PMA sublayer 608. Transmitter circuitry 900 may also include preamble checking block 944 in FEC sublayer 906. Preamble checking block 944, may be used, for example, during the training mode of operation of transmitter circuitry 900.

MAC layer 902 may be similar in function to MAC layer 702 of FIG. 6B, and may output, for example, 64 bits of data on a 64-bit data bus/link to 64B/66B encoder 622, and, for example, 8 bits of control data on 8-bit control bus/link to 64B/66B encoder 622. During training mode, MAC layer 902 may replace the regular preamble of a frame (similar to Ethernet frame 100 of FIG. 1) with a special training pattern of bits, prior to transmitting the frame to 64B/66B encoder 622. In addition, during the training mode, scrambler 624 may be bypassed.

After encoding, 64B/66B encoder 622 may output the data it receives as input from MAC layer 902 to 66-to-65 bit compressor 626 within the FEC sublayer 906. Preamble checking block 944 in FEC sublayer 906 may receive as input the output of 66-to-65 bit compressor 626. As the FEC bit block is traversing the FEC sublayer 906, preamble checking block 944 may determine whether Word 0 (i.e., the first word) of the FEC bit block is the special training pattern. If Word 0 of the FEC bit block is the special training pattern, preamble checking block 944 may assert flag_aligned signal 946 (e.g. sets flag_aligned to a logic high signal, or 1) on the feedback link associated with flag_aligned signal 946.

When flag_aligned signal 946 is asserted by preamble checking block 944, MAC layer 902 may determine when the start of the FEC bit block (e.g., the first word) traverses through FEC sublayer 906 after transmitting the preamble (that includes the special training pattern). Therefore, MAC layer 902 may be able to align the beginning of the preamble of a frame with the start (e.g., the first word) of the FEC bit block. In particular, the flag_aligned signal may be provided to MAC layer 802 or to a monitoring block (not shown) within or attached to MAC layer 902. The MAC layer or the monitoring block may have knowledge of the relationship of the transmitted preamble to the timestamp point (based on information it receives from the MAC layer) and knowledge of the forward error correction process in FEC sublayer. Using this information, the MAC layer may accurately determine the offset of a timestamp point for all future PTP messages. In some embodiments, the monitoring block may determine the offset of a timestamp point for all future PTP messages by tracking/counting the number of bits transmitted (e.g., until the next timestamp point is expected to occur in a next transmitted frame). The monitoring block may notify or make changes to the MAC layer based on this determination. In some embodiments, the MAC layer may determine the offset of a timestamp point for all future PTP messages by tracking/counting the number of bits transmitted (e.g., until the next timestamp point is expected to occur in a next transmitted frame). The scheme described in FIG. 6D may be used, for example, without the use of additional signals being generated by MAC layer 902. The scheme described in FIG. 6D, i.e. making use of a special training pattern, may be used, for example, independent of whether the interface between the MAC layer and the PCS layer is the XGMII type of interface.

Figure 7:
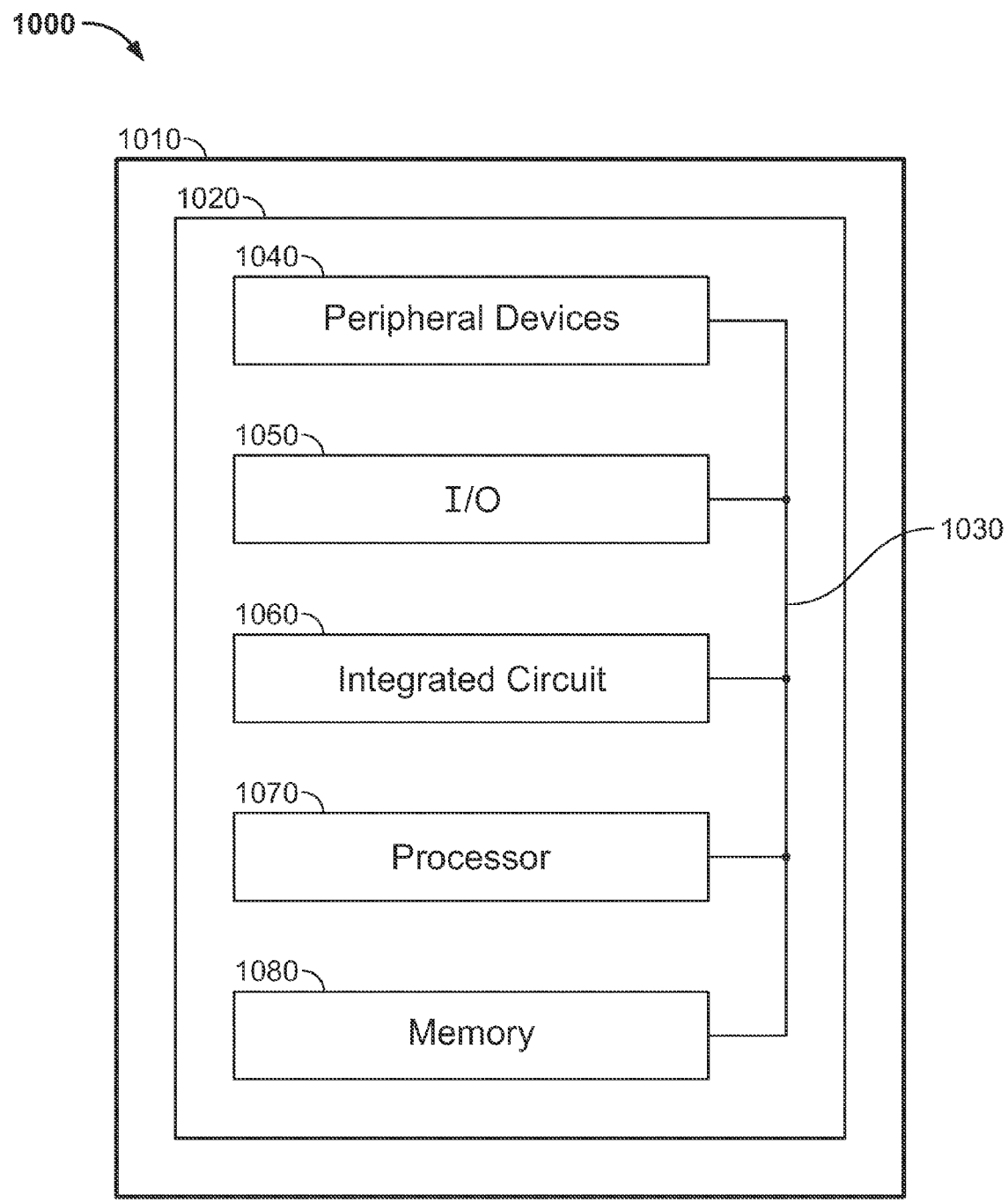
FIG. 7 illustrates an integrated circuit or other device that includes embodiments of the transmitter circuitry described herein as being within a data processing system.

FIG. 7 illustrates an integrated circuit or other device that includes embodiments of the transmitter circuitry described herein as being within a data processing system 1000. In an embodiment, the circuit or device may be an integrated circuit, a processing block, application specific standard product (ASSP), application specific integrated circuit (ASIC), programmable logic device (PLD), full-custom chip, or a dedicated chip. Data processing system 1000 can include one or more of the following components: a processor 1070, memory 1080, I/O circuitry 1050, integrated circuit 1060, and peripheral devices 1040. These components are connected together by a system bus or other interconnections 1030 and are populated on a circuit board 1020 which is contained in an end-user system 1010.

System 1000 could be used in a wide variety of applications, such as data communications, computer networking, data networking, instrumentation, video processing, digital signal processing, or any other application where the advantage of using programmable or reprogrammable logic is desirable. Circuit 1060 can be used to perform a variety of different logic functions. For example, circuit 1060 can be configured as a processor or controller that works in cooperation with processor 1070. In an embodiment, circuit 1060 may be substantially similar to any of circuitry 200, circuitry 500, circuitry 600, circuitry 700, circuitry 800, or circuitry 900. In an embodiment, circuit 1060 may be an integrated circuit, a processing block, application specific standard product (ASSP), application specific integrated circuit (ASIC), programmable logic device (PLD), full-custom chip, or a dedicated chip. Circuit 1060 may also be used as an arbiter for arbitrating access to a shared resource in system 1000. In yet another example, circuit 1060 can be configured as an interface between processor 1070 and one of the other components in system 1000. It should be noted that system 1000 is only exemplary, and that the true scope and spirit of the invention should be indicated by the following claims.

Although components in the above disclosure are described as being connected with one another, they may instead be connected to one another, possibly via other components in between them. It will be understood that the foregoing are only illustrative of the principles of the invention, and that various modifications can be made by those skilled in the art without departing from the scope and spirit of the invention. For example, one or more of the layers or sublayers described above may be implemented in separate circuitry operating on an integrated circuit or other device (as described in FIG. 7). In addition, although the present disclosure includes particular numbers for the numbers of bits in a word, bit block, or the bit widths of various busses/links, any number of bits or bit widths is possible. One skilled in the art will appreciate that the present invention can be practiced by other than the described embodiments, which are presented for purposes of illustration and not of limitation, and the present invention is limited only by the claims that follow.

What is claimed is:

1. A communication system for an integrated circuit, the system comprising:
   transmitter circuitry including:
   a medium access control (MAC) layer; and
   a forward error correction (FEC) layer coupled to the MAC layer by a data link and a feedback link, wherein the MAC layer is operable to send a message to the FEC layer on the data link, wherein the FEC layer asserts a feedback signal on the feedback link when the message arrives at the FEC layer, and wherein the MAC layer determines a timestamp value associated with the message based on the asserted feedback signal.

2. The system of claim 1, wherein the message includes a preamble of an Ethernet frame.

3. The system of claim 1, wherein the feedback signal is generated by a signal checking block within the FEC layer.

4. The system of claim 1, wherein the transmitter circuitry includes a physical coding sub-layer (PCS) that includes a signal delay block, wherein the PCS is coupled between the MAC layer and the FEC layer, and wherein the feedback signal is based on an output of the signal delay block.

5. The system of claim 4, wherein the PCS includes a pulse generation block, and wherein the feedback signal is based on an output of the pulse generation block.

6. The system of claim 4, wherein the transmitter circuitry is IEEE 10G-BASE KR transmitter circuitry, and wherein the message includes a timestamp value as a part of a Precision Time Protocol message.

7. A method for determining a timestamp value using a communication system for an integrated circuit, the method comprising:

sending a message to a forward error correction (FEC) layer on a data link using a medium access control (MAC) layer;
asserting a feedback signal on a feedback link when the message arrives at the FEC layer using the FEC layer, wherein the FEC layer is coupled to the MAC layer by the data link and the feedback link, and wherein the FEC layer and the MAC layer are included in transmitter circuitry within the communication system; and
determining, using the MAC layer, the timestamp value associated with the message based on the asserted feedback signal.

8. The method of claim 7, wherein the message includes a preamble of an Ethernet frame.

9. The method of claim 7, further comprising generating the feedback signal using a signal checking block within the FEC layer.

10. The method of claim 7, wherein a physical coding sub-layer (PCS), included in the transmitter circuitry, is coupled between the MAC layer and the FEC layer, and wherein the feedback signal is based on an output of a signal delay block within the PCS.

11. The method of claim 10, wherein the feedback signal is based on an output of a pulse generation block within the PCS.

12. The method of claim 10, wherein the transmitter circuitry is IEEE 10G-BASE KR transmitter circuitry, and wherein the message includes the timestamp value as a part of a Precision Time Protocol message.

13. A communication system for a programmable logic device, the system comprising:
   a medium access control (MAC) layer; and
   a forward error correction (FEC) layer coupled to the MAC layer by a feedback link, wherein the MAC layer is operable to send a message to the FEC layer,
   wherein the FEC layer asserts a feedback signal on the feedback link when the message arrives at the FEC layer, and wherein the MAC layer determines a timestamp value associated with the message based on the asserted feedback signal.

14. The system of claim 13, wherein the message includes a preamble of an Ethernet frame.

15. The system of claim 13, wherein the feedback signal is generated by a signal checking block within the FEC layer.

16. The system of claim 13 further comprising a physical coding sub-layer (PCS) that includes a signal delay block, wherein the PCS is coupled between the MAC layer and the FEC layer, and wherein the feedback signal is based on an output of the signal delay block.

17. The system of claim 16, wherein the PCS includes a pulse generation block, and wherein the feedback signal is based on an output of the pulse generation block.

* * * * *